(12) United States Patent
Sriram et al.

(10) Patent No.: US 11,102,105 B2
(45) Date of Patent: Aug. 24, 2021

(54) SERVICE INTEGRATED DOMAIN NAME SERVER

(71) Applicant: Charter Communications Operating, LLC, St. Louis, MO (US)

(72) Inventors: Ajay G. Sriram, Lone Tree, CO (US); James Kruczek, Glendale, CO (US); Tyson Reid Vinson, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 119 days.

(21) Appl. No.: 16/592,964

(22) Filed: Oct. 4, 2019

(65) Prior Publication Data

US 2021/0105202 A1 Apr. 8, 2021

(51) Int. Cl.
*G06F 15/173* (2006.01)
*H04L 12/26* (2006.01)
*H04L 29/12* (2006.01)

(52) U.S. Cl.
CPC .......... *H04L 43/50* (2013.01); *H04L 43/0888* (2013.01); *H04L 61/1511* (2013.01); *H04L 61/2015* (2013.01)

(58) Field of Classification Search
CPC ............. H04L 61/1511; H04L 67/1008; H04L 67/1021; H04L 29/12066; H04L 67/1031
USPC ................................................. 709/223, 224
See application file for complete search history.

(56) References Cited

U.S. PATENT DOCUMENTS

| | | | |
|---|---|---|---|
| 8,365,018 B2 * | 1/2013 | McIntosh | H04L 43/50 714/23 |
| 2018/0013716 A1 * | 1/2018 | Connell | H04L 67/18 |

* cited by examiner

*Primary Examiner* — Wing F Chan
*Assistant Examiner* — Andrew Woo
(74) *Attorney, Agent, or Firm* — Young Basile Hanlon & MacFarlane, P.C.

(57) ABSTRACT

Methods and systems for service integrated domain name servers are described. A method for service integrated domain name server processing includes receiving, by a requesting device, a service fully qualified domain name (FQDN) and an anycast Internet Protocol (IP) address for service integrated domain name servers, where each service integrated domain name server includes the anycast IP address and a unicast IP address. The requesting device queries domain name servers on the service integrated domain name servers with the anycast IP address to resolve the service FQDN. The requesting device receives the unicast IP address from a closest service integrated domain name server. The requesting device saves the unicast IP address, sends to a service server on the closest service integrated domain name server, a service request on the unicast IP address and receives from the service server, results for the service request.

20 Claims, 6 Drawing Sheets

SERVICE INTEGRATED DOMAIN NAME SERVER

TECHNICAL FIELD

This disclosure relates to communications networks. More specifically, this disclosure relates to monitoring, selecting and locking most appropriate server for a service or diagnostic requested by a customer premise equipment or client.

BACKGROUND

Large internet service providers (ISPs), multiple service operators (MSOs), and the like (collectively service providers) offer multiple service packages to customers with different speeds to customers. The service providers are required to validate the offered speeds from the customer's location. Speed test servers are deployed on the network by the service providers to validate speeds at the customer's location. To address latency issues and the like, identification of the closest and most functional or healthiest speed test server is necessary. There are multiple ways to identify the closest healthiest speed test server.

One method uses global server load balancing (GSLB), which can identify the closest server using the domain name system (DNS) recursive server location used by the client to query the speed test servers. However, this method is not reliable as the recursive server used by the client may be farther away from the location of the client. Another method uses anycast, where speed test servers advertise using the same Internet Protocol (IP) address and the client's speed test request is routed to the closest anycast speed test server. This method is not reliable in cases of issues arising from routing protocol changes or similar, and the speed test may potentially be routed to a farther node. This also presents a problem when a controller has to prepare the speed test server as the controller will not know the closest speed test server from the client's perspective. Moreover, different speed test servers may be used during testing due to routing or other considerations. Another method uses a static topology list of speed test servers and their geo-location. The client's geo-location is used to select the closest healthiest server. This is a cumbersome process for maintaining locations of the speed test servers as speed test servers are added or decommissioned. Moreover, current processes for identifying a client location are not accurate.

The above issues with respect to speed test servers are applicable to any diagnostic which a client may run and which requires access to a server to run the diagnostic. Selection of the diagnostic server may be based on location, capability, health, and the like. Identification of the proper server in a reliable and consistent basis is important for many services provided to the client such as, but not limited to, communicating content to and from a content delivery network.

SUMMARY

Disclosed herein are methods and systems for service integrated domain name servers. A method for service integrated domain name server processing includes receiving, by a requesting device, a service fully qualified domain name (FQDN) and an anycast Internet Protocol (IP) address for service integrated domain name servers, where each service integrated domain name server includes the anycast IP address and a unicast IP address. The requesting device queries domain name servers on the service integrated domain name servers with the anycast IP address to resolve the service FQDN. The requesting device receives the unicast IP address from a closest service integrated domain name server. The requesting device saves the unicast IP address, sends to a service server on the closest service integrated domain name server, a service request on the unicast IP address and receives from the service server, results for the service request.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
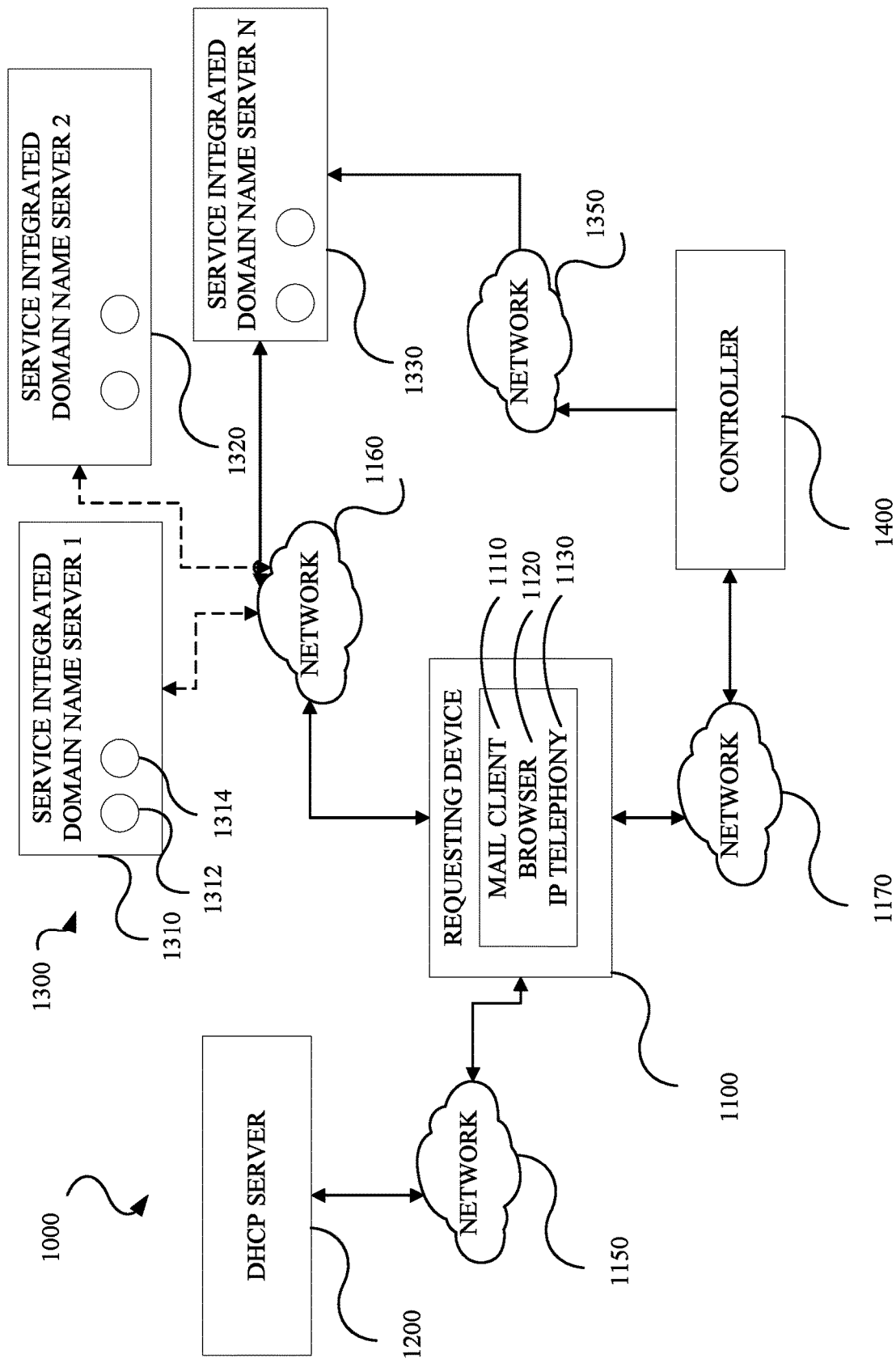
FIG. 1 is a diagram of an example architecture with a service integrated domain name system (DNS) in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for a service integrated domain name system (DNS) server. A service integrated DNS server has an anycast interface and a unicast interface, which collectively handle a client's request for a service such as a speed test, diagnostic, static content delivery, or any like service. The anycast interface enables routing of the client's request to the closest service integrated DNS server and resolves to the unicast interface. The anycast interface and unicast interface are independent with respect to functionality. The dual interface mechanism may improve reliability and provides consistency when executing the service request.

In an implementation, a fully qualified domain name (FQDN) is established for the service integrated DNS server and service. The service integrated DNS server(s) are authoritative for the FQDN. The Internet Protocol (IP) address resolved from the FQDN is saved by the client or a controller and is used for performing or executing the service request. The pinning or locking of the IP address ties service requests to the same unicast interface and permits comparability between test or diagnostic type requests.

In an implementation, a customer premise equipment may be provided with the FQDN and service integrated DNS server IP address at boot-up by a Dynamic Host Configuration Protocol (DHCP) server. In an implementation, the customer premise equipment may be set with the FQDN and service integrated DNS server IP address by the controller. In an implementation, a combination of the DHCP server and the controller may be used to set the FQDN and service integrated DNS server IP address at boot-up and on an on-demand basis.

FIG. 1 is a diagram of an example architecture 1000 using service integrated DNS servers 1300 in accordance with embodiments of this disclosure. In an implementation, the architecture 1000 may include a requesting device 1100 connected to or in communication with (collectively "connected to") a DHCP server 1200, plurality of service integrated DNS servers 1300, and a controller 1400. In an implementation, the connection between the requesting device 1100 and the DHCP server 1200 may be through a network 1150. In an implementation, the connection between the requesting device 1100 and the plurality of service integrated DNS servers 1300 may be through a network 1160. In an implementation, the connection between the requesting device 1100 and the controller 1400 may be through a network 1170. The controller 1400 is connected to the plurality of service integrated DNS servers 1300. In an implementation, the connection between the controller 1400 and the plurality of service integrated DNS servers 1300 may be through a network 1350. The connections between the requesting device 1100, the DHCP server 1200, the plurality of service integrated DNS servers 1300, the controller 1400, the network 1150, the network 1160, the network 1170, and the network 1350 may be wired, wireless or a combination thereof. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The requesting device 1100 is a device in the customer or subscriber location from where a speed test, a diagnostic test, a service request, and the like (collectively "service request") is requested. The requesting device 1100 may be, but is not limited to, customer premises equipment, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets, Internet gateway or router in customer premises, and the like. For example, in an implementation, the requesting device 1100 may include applications such as, but not limited to, a mail application 1110, a web browser application 1115, an IP telephony application 1120 and the like.

The DHCP server 1200 is a server which uses DHCP to provide the initial network configurations (referred to as DHCP options) and services to the requesting device 1100. The DHCP is a network management protocol used by the DHCP server 1200 to dynamically assign an IP address and other network configuration parameters to each device on a network so they can communicate with other IP network elements or devices.

The plurality of service integrated DNS servers 1300 may include, for example, service integrated DNS server 1 1310, service integrated DNS server 2 1320, . . . , service integrated DNS server N 1330. Each service integrated DNS server 1300 includes a DNS server or service, which may be a directory or a lookup service that translates easy to read names to an IP (Internet Protocol) address, integrated with a service server, which runs or performs a service such as, but not limited to, a speed test, a communications related diagnostic, content service, and the like. Each of the service integrated DNS servers 1300 includes an anycast interface, which uses or advertises with a same Internet Protocol (IP) address (anycast IP address), for running the DNS service (the DNS server and the anycast interface shown collectively as 1312) and a unicast interface, which uses an IP address (unicast IP address) different from the anycast IP address, for running or executing the service request (the service server and unicast interface shown collectively as 1314). A FQDN is established and associated with the plurality of service integrated DNS servers 1300. The DNS server or service of the service integrated DNS servers 1300 is authoritative for this FQDN. Each service integrated DNS server 1300 resolves this FQDN to the unicast IP address. That is, this FQDN will resolve to a different IP address (the unicast IP address) depending on the DNS server (and the anycast IP address) that was used by the requesting device 1100 and its location.

The controller 1400 is an application and/or server which initiates the service request for certain types of service requests, such as a speed test or diagnostic, for the client in addition to setting up the service server for the service. In an implementation, the controller 1400 could be an Auto configuration server (ACS). In an illustrative example, the controller 1400 prepares a speed test server (which is the service integrated DNS server 1300 or an integrated part thereof) for a speed test and directs the requesting device 1100 to download or upload diagnostics against the speed test server. The results of the test can then be retrieved by the controller 1400. In an implementation, the controller 1400 may request a selected or routed service integrated DNS server to withhold from taking further requesting devices.

The network 1150, network 1160, network 1170 and the network 1350 may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof.

The operational description is with respect to a speed test use case. Different use cases may be used without departing from the scope of the specification and claims. Operationally, the requesting device 1100 boots up and requests an IP address for requesting the speed test from the DHCP server 1200. The DHCP server 1200 provides the FQDN for the speed test and the anycast IP address for the service integrated DNS servers 1300. In an implementation, the requesting device 1100 may use the same software or IP stack for connecting to the Internet and performing the speed test. In this instance, the data model used by or in the requesting device 1100 may include additional attributes to save the FQDN for the speed test and the anycast IP address. In an implementation, the requesting device 1100 may use different software or IP stacks for connecting to the Internet and performing the speed test. In this instance, the request to the DHCP server 1200 may indicate that the IP address requested is for a speed test IP stack or interface. The requesting device 1100 stores the FQDN for the speed test and the anycast IP address accordingly.

The requesting device 1100 queries the service integrated DNS servers 1300 to perform a DNS lookup and resolve the FQDN. A closest and healthiest service integrated DNS server 1300, such as for example service integrated DNS server N 1330, responds and returns (via the DNS interface) with a unicast IP address for the speed test interface of the service integrated DNS server N 1330. The requesting device 1100 stores the unicast IP address and refreshes the unicast IP address in accordance with the time-to-live (TTL) provided by the DNS service of the service integrated DNS server N 1330.

The controller 1400 retrieves the stored unicast IP address, connects with the service integrated DNS server N 1330 over the unicast or speed test interface, and sets or configures the speed test server or service of the service integrated DNS server N 1330 to perform a speed test. The controller 1400 instructs or directs the requesting device 1100 to initiate the speed test with the service integrated DNS server N 1330 using the unicast IP address. The requesting device 1100 initiates the speed test and stores the results. In an implementation, the requesting device 1100 may send the results to the controller 1400 for analysis. In an implementation, the controller 1400 or other MSO elements may retrieve and analyze the speed test results.

Accordingly, since the unicast IP address is stored (pinned and locked) and accessible by the controller 1400, future speed tests are performed with the same service integrated DNS server and results for the speed tests can be compared appropriately.

Figure 2:
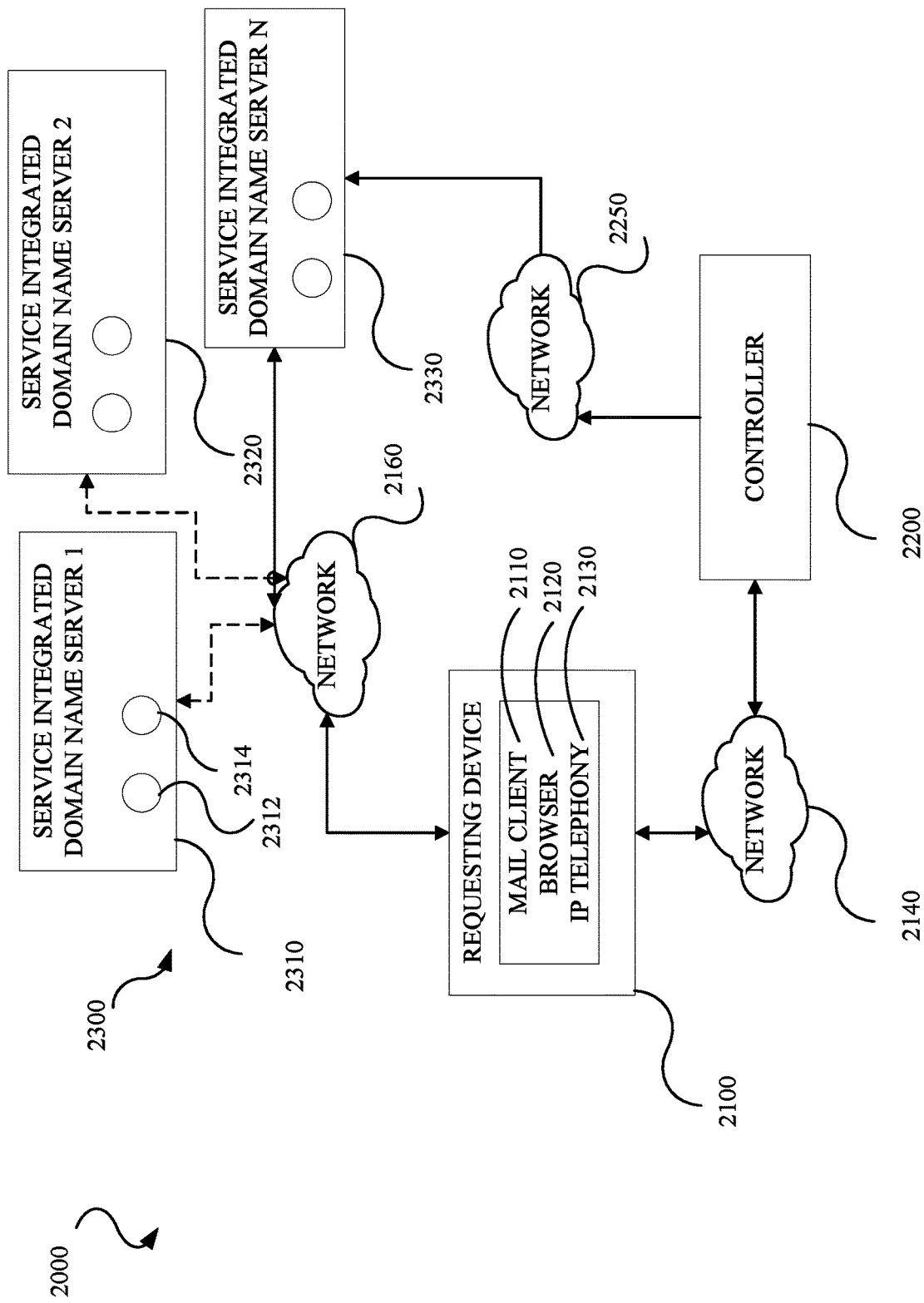
FIG. 2 is a diagram of another example architecture with a service integrated DNS in accordance with embodiments of this disclosure.

FIG. 2 is a diagram of an example architecture 2000 using service integrated DNS servers 2300 in accordance with embodiments of this disclosure. In an implementation, the architecture 2000 may include a requesting device 1100 connected to or in communication with (collectively "connected to") a controller 2200 and a plurality of service integrated DNS servers 2300. In an implementation, the connection between the requesting device 1100 and the controller 2200 may be through a network 2140. In an implementation, the connection between the requesting device 2100 and the plurality of service integrated DNS servers 2300 may be through a network 2160. The controller 2200 is connected to the plurality of service integrated DNS servers 2300. In an implementation, the connection between the controller 2200 and the plurality of service integrated DNS servers 2300 may be through a network 2250. The connections between the requesting device 2100, the controller 2200, and the plurality of service integrated DNS servers 2300, the network 2140, the network 2160, and the network 2250 may be wired, wireless or a combination thereof. The architecture 2000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The requesting device 2100 is a device in the customer or subscriber location from where a speed test, a diagnostic test, a service request, and the like (collectively "service request") is requested. The requesting device 2100 may be, but is not limited to, customer premises equipment, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets, Internet Gateway or router in customer premises, and the like. For example, in an implementation, the requesting device 2100 may include applications such as, but not limited to, a mail application 2110, a web browser application 2115, an IP telephony application 2120 and the like.

The plurality of service integrated DNS servers 2300 may include, for example, service integrated DNS server 1 2310, service integrated DNS server 2 2320, . . . , service integrated DNS server N 2330. Each service integrated DNS server 2300 includes a DNS server or service, which may be a directory or a lookup service that translates easy to read names to an IP (Internet Protocol) address, integrated with a service server, which runs or performs a service such as, but not limited to, a speed test, a communications related diagnostic, content service, and the like. Each of the service integrated DNS servers 2300 includes an anycast interface, which uses or advertises with a same Internet Protocol (IP) address (anycast IP address), for running the DNS service (the DNS server and the anycast interface shown collectively as 2312) and a unicast interface, which uses an IP address (unicast IP address) different from the anycast IP address, for running or executing the service request (the service server and unicast interface shown collectively as 2314). A FQDN is established and associated with the plurality of service integrated DNS servers 2300. The DNS server or service of the service integrated DNS servers 2300 is authoritative for this FQDN. Each service integrated DNS server 2300 resolves this FQDN to the unicast IP address. That is, this FQDN will resolve to a different IP address (the unicast IP address) depending on the DNS server (and the anycast IP address) that was used by the requesting device 2100 and its location.

The controller 2200 is an application and/or server which initiates the service request for certain types of service requests, such as a speed test or diagnostic, for the client in addition to setting up the service server for the service. In an implementation, the controller 2200 could be an Auto configuration server (ACS). The controller sets or configures the requesting device 2100 with the FQDN and the anycast IP address of the service integrated DNS servers 2300. In an illustrative example, the controller 2200 prepares a speed test server (which is the service integrated DNS server 1300 or an integrated part thereof) for a speed test and directs the requesting device 2100 to download or upload diagnostics against the speed test server. The results of the test can then be retrieved by the controller 2200. In an implementation, the controller 2200 may request a selected or routed service integrated DNS server to withhold from taking further requesting devices.

The network 2140, network 2160, and the network 2250 may be, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof.

The operational description is with respect to a speed test use case. Different use cases may be used without departing from the scope of the specification and claims. Operationally, the requesting device 2100 is provisioned, online, and ready to perform a speed test. The controller 2200 sets or provides the FQDN for the speed test and the anycast IP address for the service integrated DNS servers 2300. In an implementation, the requesting device 2100 may use the same software or IP stack for connecting to the Internet and performing the speed test. In this instance, the data model used by or in the requesting device 2100 may include additional attributes to save the FQDN for the speed test and the anycast IP address. In an implementation, the requesting device 2100 may use different software or IP stacks for connecting to the Internet and performing the speed test. The requesting device 2100 stores the FQDN for the speed test and the anycast IP address accordingly.

The requesting device 2100 queries the service integrated DNS servers 2300 to perform a DNS lookup and resolve the FQDN. A closest and healthiest service integrated DNS server 2300, such as for example service integrated DNS server N 2330, responds and returns (via the DNS interface) with a unicast IP address for the speed test interface of the service integrated DNS server N 2330. The requesting device 2100 stores the unicast IP address and refreshes the unicast IP address in accordance with the time-to-live (TTL) provided by the DNS service of the service integrated DNS server N 2330.

The controller 2200 retrieves the stored unicast IP address, connects with the service integrated DNS server N 2330 over the unicast or speed test interface, and sets or configures the speed test server or service of the service integrated DNS server N 2330 to perform a speed test. The controller 2200 instructs or directs the requesting device 2100 to initiate the speed test with the service integrated DNS server N 2330 using the unicast IP address. The requesting device 2100 initiates the speed test and stores the results. In an implementation, the requesting device 2100 may send the results to the controller 2200 for analysis. In an implementation, the controller 2200 or other MSO elements may retrieve and analyze the speed test results.

Accordingly, since the unicast IP address is stored (pinned and locked) and accessible by the controller 2200, future speed tests are performed with the same service integrated DNS server and results for the speed tests can be compared appropriately.

Referring back to FIG. 1, in an implementation, the controller 1400 incorporates the functionality of the controller 2200 of FIG. 2. In this instance, the DHCP server 1200 and the controller 1400 can each be used to set the special FQDN and the anycast IP address of the service integrated DNS servers 1300. This ensures that the settings exist during boot-up of the requesting device 1200 and also provides a process or ability to change the settings on demand via the controller 1400 in the event, for example, if the service integrated DNS server associated with the stored unicast IP address is unhealthy or unavailable.

As before, the operational description is with respect to a speed test use case. Different use cases may be used without departing from the scope of the specification and claims. Operationally, the requesting device 1100 boots up and requests an IP address for requesting the speed test from the DHCP server 1200. The DHCP server 1200 provides the FQDN for the speed test and the anycast IP address for the service integrated DNS servers 1300. In an implementation, the controller 1400 can provide the FQDN for the speed test and the anycast IP address for the service integrated DNS servers 1300 once the requesting device 1100 is online and reachable by the controller 1400. In an implementation, the controller 1400 can provide different settings on an on-demand basis, on an event driven basis, or the like. In an implementation, the requesting device 1100 may use the same software or IP stack for connecting to the Internet and performing the speed test. In this instance, the data model used by or in the requesting device 1100 may include additional attributes to save the FQDN for the speed test and the anycast IP address. In an implementation, the requesting device 1100 may use different software or IP stacks for connecting to the Internet and performing the speed test. In this instance, the request to the DHCP server 1200 may indicate that the IP address requested is for a speed test IP stack or interface. The requesting device 1100 stores the FQDN for the speed test and the anycast IP address accordingly.

The requesting device 1100 queries the service integrated DNS servers 1300 to perform a DNS lookup and resolve the FQDN. A closest and healthiest service integrated DNS server 1300, such as for example service integrated DNS server N 1330, responds and returns (via the DNS interface) with a unicast IP address for the speed test interface of the service integrated DNS server N 1330. The requesting device 1100 stores the unicast IP address and refreshes the unicast IP address in accordance with the time-to-live (TTL) provided by the DNS service of the service integrated DNS server N 1330.

The controller 1400 retrieves the stored unicast IP address, connects with the service integrated DNS server N 1330 over the unicast or speed test interface, and sets or configures the speed test server or service of the service integrated DNS server N 1330 to perform a speed test. The controller 1400 instructs or directs the requesting device 1100 to initiate the speed test with the service integrated DNS server N 1330 using the unicast IP address. The requesting device 1100 initiates the speed test and stores the results. In an implementation, the requesting device 1100 may send the results to the controller 1400 for analysis. In an implementation, the controller 1400 or other MSO elements may retrieve and analyze the speed test results.

Accordingly, since the unicast IP address is stored (pinned and locked) and accessible by the controller 1400, future speed tests are performed with the same service integrated DNS server and results for the speed tests can be compared appropriately.

Figure 3:
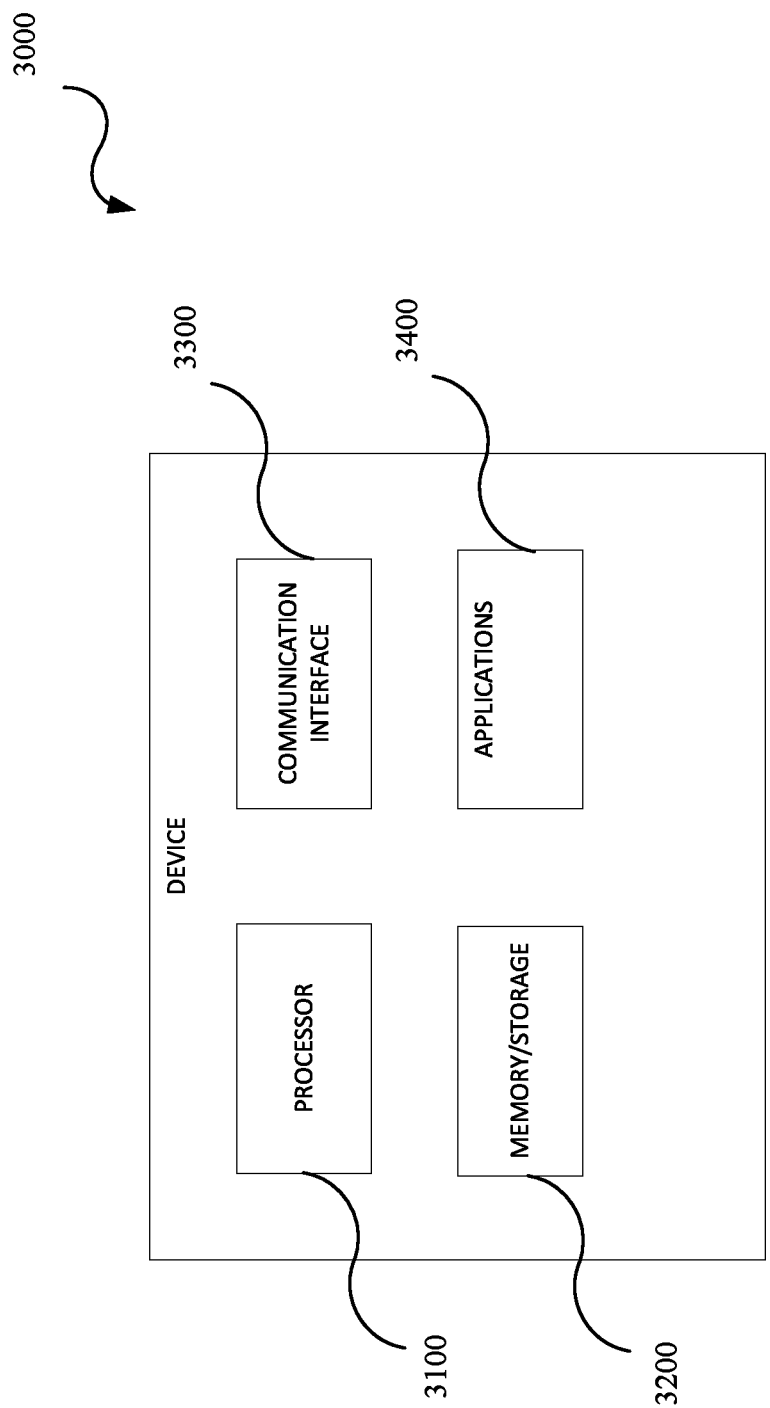
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the requesting device 1100, the DHCP server 1200, each of the service integrated DNS servers 1300, the controller 1400, the requesting device 2100, the controller 2200, and each of the service integrated DNS servers 2300, for example. The service integrated DNS server techniques or methods described herein may be stored in the memory/storage 3200 and executed by the processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
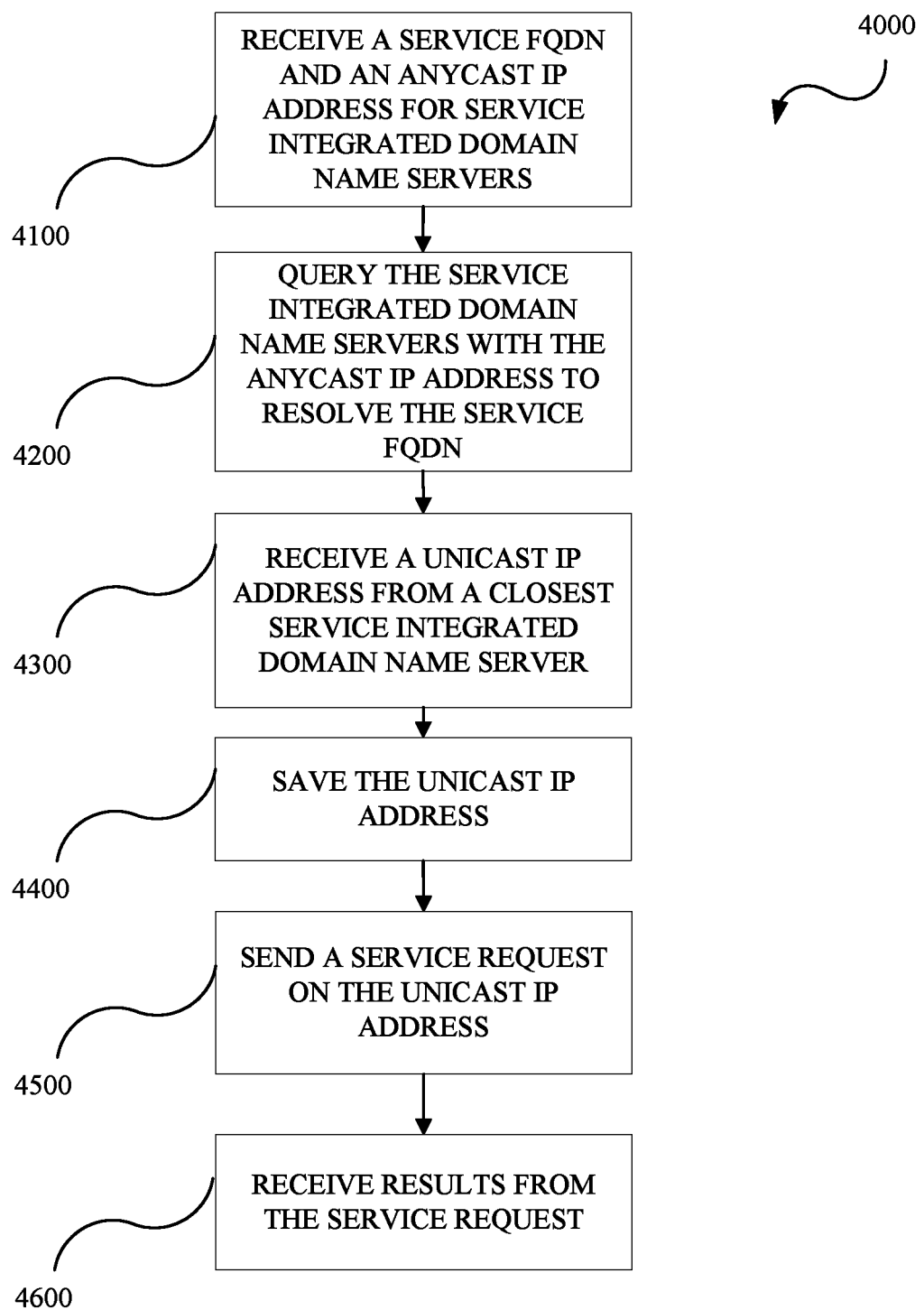
FIG. 4 is a flowchart of an example method for a service integrated DNS in accordance with embodiments of this disclosure.

FIG. 4 is a flowchart of an example method 4000 for service integrated domain name servers in accordance with embodiments of this disclosure. The method 4000 includes: receiving 4100 a service FQDN and an anycast IP address for service integrated domain name servers; querying 4200 the service integrated domain name servers with the anycast IP address to resolve the service FQDN; receiving 4300 a unicast IP address from a closest service integrated domain name server; saving 4400 the unicast IP address; sending 4500 a service request on the unicast IP address; and receiving 4600 results from the service request. For example, the method or technique 4000 may be implemented, as applicable and appropriate, by the requesting device 1100 of FIG. 1, the DHCP server 1200 of FIG. 1, the service integrated domain name servers 1300 of FIG. 1, the controller 1400 of FIG. 1, the requesting device 2100 of FIG. 2, the service integrated domain name servers 2300 of FIG. 2, the controller 2200 of FIG. 2, and the processor 3100 of FIG. 3.

The method 4000 includes receiving 4100 a service FQDN and an anycast IP address for service integrated domain name servers. Service integrated domain name servers include an anycast interface for a DNS server or service and a unicast interface for a service server, where the anycast interface and unicast server have different IP addresses. Each of the service integrated domain name servers is authoritative with respect to the service FQDN. In an implementation, a requesting device boots up and requests from a DHCP server the service FQDN and the anycast IP address for the service integrated domain name servers. In an implementation, a controller sets or configures the requesting device once the requesting device is online and reachable. In an implementation, the controller sets or configures the requesting device on an on-demand basis. In an implementation, the controller sets or configures the requesting device on an event driven basis, where an event, for example but is not limited to, an unhealthy or unavailable service integrated domain name server. In an implementation, the requesting device saves the service FQDN and anycast IP address.

The method 4000 includes querying 4200 the service integrated domain name servers with the anycast IP address to resolve the service FQDN. In an implementation, the requesting device sends a query to resolve the service FQDN upon receipt of the service FQDN and the anycast IP address. In an implementation, the requesting device sends a query to resolve the service FQDN upon initiation of or request by the controller.

The method 4000 includes receiving 4300 a unicast IP address from a closest service integrated domain name server. The requesting device receives a resolved IP address from a closest, healthy, and available service integrated domain name server. The resolved unicast IP address is applicable to the unicast interface on the service integrated domain name server as opposed to the anycast interface on the service integrated domain name server on which the query was sent.

The method 4000 includes saving 4400 the unicast IP address. The unicast IP address is saved locally on the requesting device.

The method 4000 includes sending 4500 a service request on the unicast IP address. The requesting device sends the service request upon initiation of or as directed by the controller. The controller retrieves the unicast IP address from the requesting device and connects to the service server of the service integrated domain name server via the unicast interface and sets up the service server for receiving and executing a service request. In an implementation, the controller stores the unicast IP address.

The method 4000 includes receiving 4600 results from the service request. The requesting device saves the results or content from the service server. In an implementation, the controller requests the results from the requesting device. In an implementation, the requesting device automatically sends the results or content to the controller.

Figure 5:
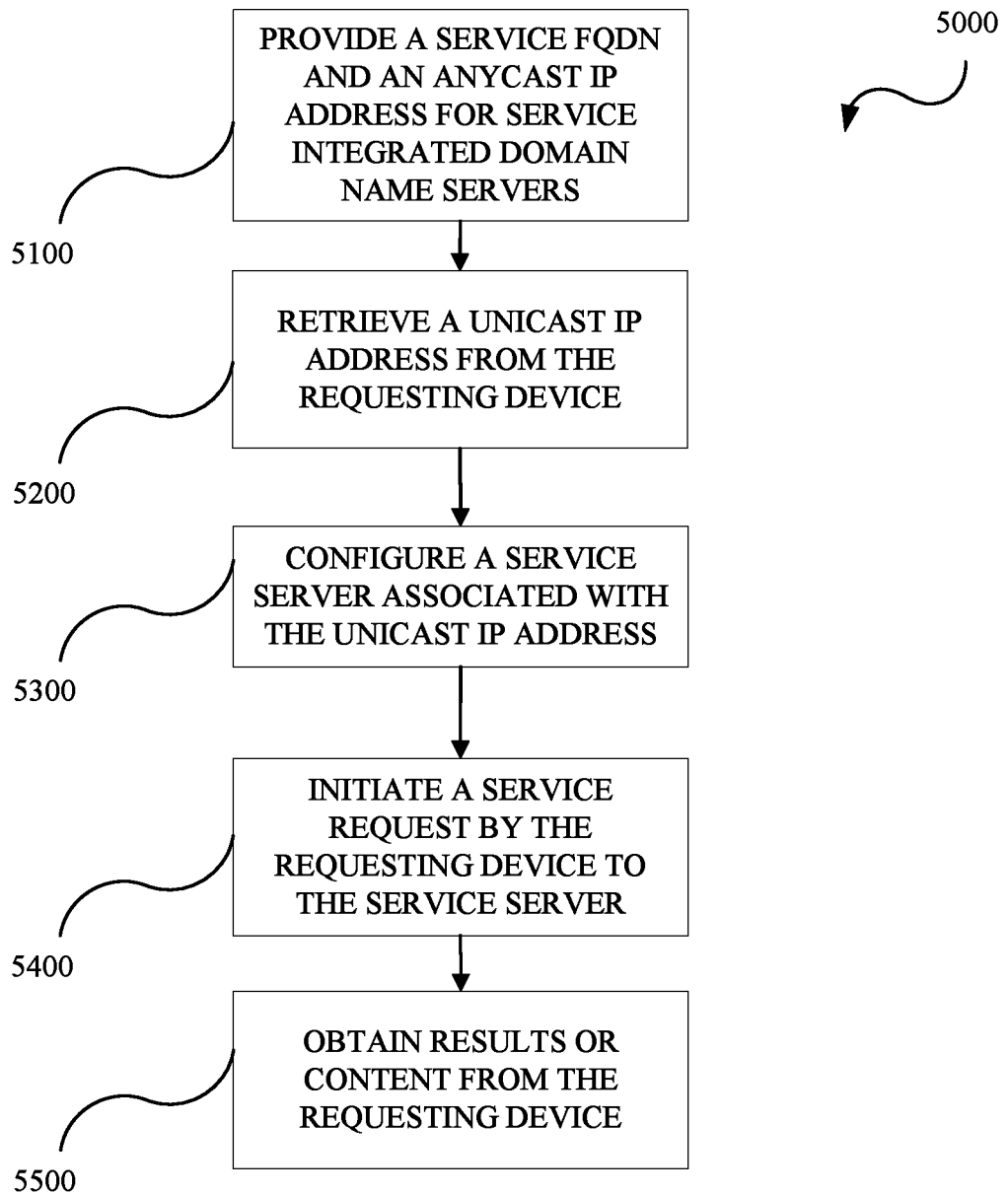
FIG. 5 is a flowchart of another example method for a service integrated DNS in accordance with embodiments of this disclosure.

FIG. 5 is a flowchart of an example method 5000 for service integrated domain name servers in accordance with embodiments of this disclosure. The method 5000 includes: providing 5100 a service FQDN and an anycast IP address for service integrated domain name servers; retrieving 5200 a unicast IP address from the requesting device; configuring 5300 a service server associated with the unicast IP address; initiating 5400 a service request by the requesting device to the service server; and obtaining 5500 results or content from the requesting device. For example, the method or technique 5000 may be implemented, as applicable and appropriate, by the requesting device 1100 of FIG. 1, the DHCP server 1200 of FIG. 1, the service integrated domain name servers 1300 of FIG. 1, the controller 1400 of FIG. 1, the requesting device 2100 of FIG. 2, the service integrated domain name servers 2300 of FIG. 2, the controller 2200 of FIG. 2, and the processor 3100 of FIG. 3.

The method 5000 includes providing 5100 a service FQDN and an anycast IP address for service integrated domain name servers. Service integrated domain name servers include an anycast interface for a DNS server or service and a unicast interface for a service server, where the anycast interface and unicast server have different IP addresses. Each of the service integrated domain name servers is authoritative with respect to the service FQDN. In an implementation, a DHCP server provides the service FQDN and the anycast IP address for the service integrated domain name servers upon request by of a requesting. In an implementation, a controller sets or configures the requesting device once the requesting device is online and reachable. In an implementation, the controller sets or configures the requesting device on an on-demand basis. In an implementation, the controller sets or configures the requesting device on an event driven basis, where an event, for example but is not limited to, an unhealthy or unavailable service integrated domain name server. In an implementation, the requesting device saves the service FQDN and anycast IP address.

The method 5000 includes retrieving 5200 a unicast IP address from the requesting device. The controller retrieves from the requesting device a saved resolved IP address after the requesting device had sent a query to the service integrated domain name servers with the anycast IP address to resolve the service FQDN. The query results come from a closest (and/or healthiest and available) service integrated domain name server. The resolved unicast IP address is applicable to the unicast interface on the service integrated domain name server as opposed to the anycast interface on the service integrated domain name server on which the query was sent. In an implementation, the controller requests the requesting device to send the query to resolve the service FQDN. In an implementation, the controller stores the unicast IP address.

The method 5000 includes configuring 5300 a service server associated with the unicast IP address. The controller connects to the service server of the service integrated domain name server via the unicast interface and sets up the service server for receiving and executing a service request.

The method 5000 includes initiating 5400 a service request by the requesting device to the service server. After configuring the service server, the controller directs or instructs the requesting device to send a service request to the service server using the unicast IP address.

The method 5000 includes obtaining 5500 results or content from the requesting device. In an implementation, the controller requests the results from the requesting device. In an implementation, the requesting device automatically sends the results or content to the controller.

Figure 6:
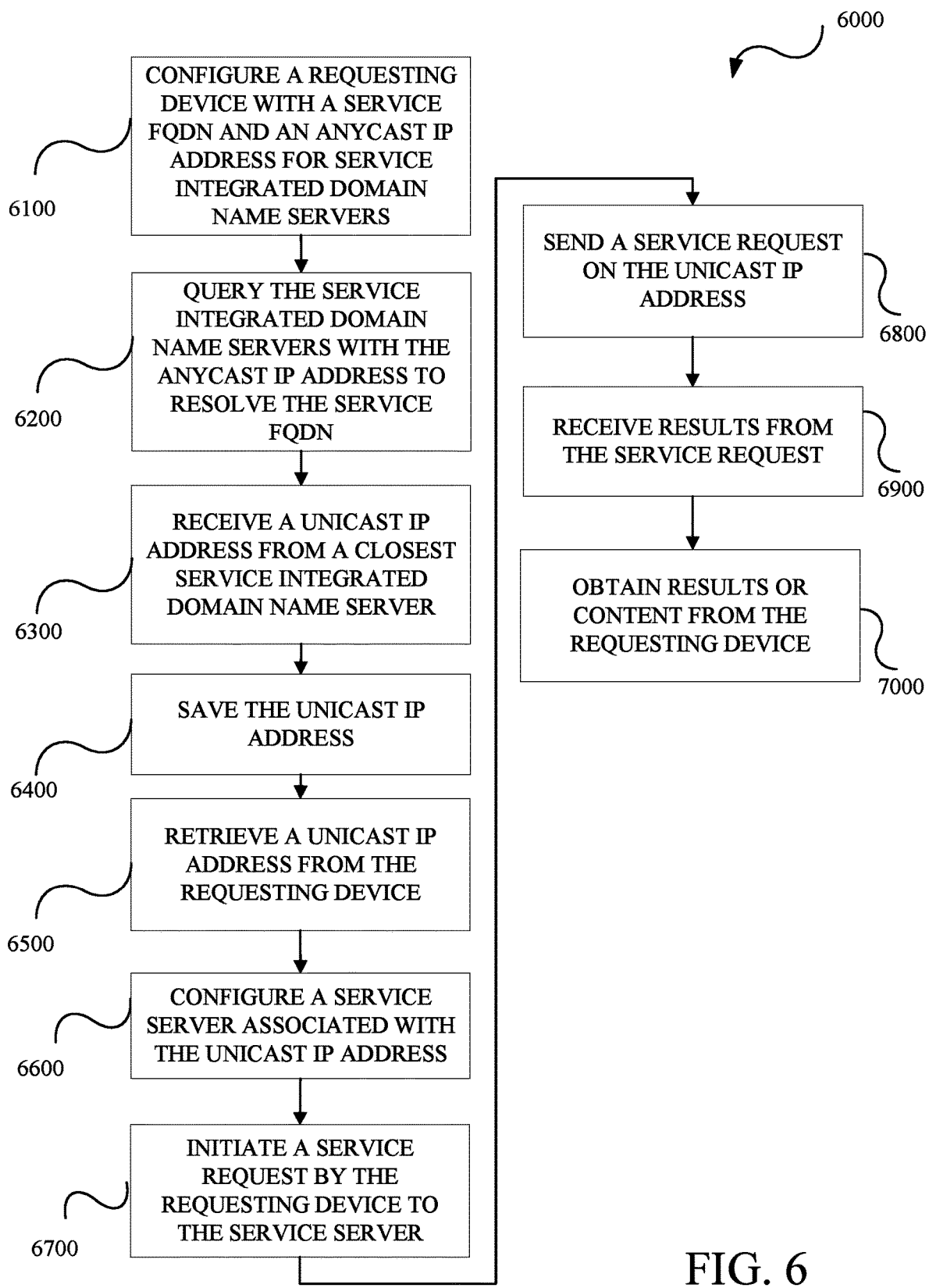
FIG. 6 is a flowchart of another example method for a service integrated DNS in accordance with embodiments of this disclosure.

FIG. 6 is a flowchart of an example method 6000 for service integrated domain name servers in accordance with embodiments of this disclosure. The method 6000 includes: configuring 6100 a requesting device with a service FQDN and an anycast IP address for service integrated domain name servers; querying 6200 the service integrated domain name servers with the anycast IP address to resolve the service FQDN; receiving 6300 a unicast IP address from a closest service integrated domain name server; saving 6400 the unicast IP address; retrieving 6500 a unicast IP address from the requesting device; configuring 6600 a service server associated with the unicast IP address; initiating 6700 a service request by the requesting device to the service server; sending 6800 a service request on the unicast IP address; receiving 6900 results from the service request; and obtaining 7000 results or content from the requesting device. For example, the method or technique 6000 may be implemented, as applicable and appropriate, by the requesting device 1100 of FIG. 1, the DHCP server 1200 of FIG. 1, the service integrated domain name servers 1300 of FIG. 1, the controller 1400 of FIG. 1, the requesting device 2100 of FIG. 2, the service integrated domain name servers 2300 of FIG. 2, the controller 2200 of FIG. 2, and the processor 3100 of FIG. 3.

The method 6000 includes configuring 6100 a requesting device with a service FQDN and an anycast IP address for service integrated domain name servers. Service integrated domain name servers include an anycast interface for a DNS server or service and a unicast interface for a service server, where the anycast interface and unicast server have different IP addresses. Each of the service integrated domain name servers is authoritative with respect to the service FQDN. In an implementation, a requesting device boots up and requests from a DHCP server the service FQDN and the anycast IP address for the service integrated domain name servers. In an implementation, a controller sets or configures the requesting device once the requesting device is online and reachable. In an implementation, the controller sets or configures the requesting device on an on-demand basis. In an implementation, the controller sets or configures the requesting device on an event driven basis, where an event, for example but is not limited to, an unhealthy or unavailable service integrated domain name server. In an implementation, the requesting device saves the service FQDN and anycast IP address.

The method 6000 includes querying 6200 the service integrated domain name servers with the anycast IP address to resolve the service FQDN. In an implementation, the requesting device sends a query to resolve the service FQDN upon receipt of the service FQDN and the anycast IP address. In an implementation, the requesting device sends a query to resolve the service FQDN upon initiation of or request by the controller.

The method 6000 includes receiving 6300 a unicast IP address from a closest service integrated domain name server. The requesting device receives a resolved IP address from a closest, healthy, and available service integrated domain name server. The resolved unicast IP address is applicable to the unicast interface on the service integrated domain name server as opposed to the anycast interface on the service integrated domain name server on which the query was sent.

The method 6000 includes saving 6400 the unicast IP address. The unicast IP address is saved locally on the requesting device. The controller retrieves the unicast IP address from the requesting device and connects to the service server of the service integrated domain name server via the unicast interface and sets up the service server for receiving and executing a service request. In an implementation, the controller stores the unicast IP address.

The method 6000 includes retrieving 6500 a unicast IP address from the requesting device. The controller retrieves from the requesting device a saved resolved IP address after the requesting device had sent a query to the service integrated domain name servers with the anycast IP address to resolve the service FQDN. The query results come from a closest (and/or healthiest and available) service integrated domain name server. The resolved unicast IP address is applicable to the unicast interface on the service integrated domain name server as opposed to the anycast interface on the service integrated domain name server on which the query was sent. In an implementation, the controller requests the requesting device to send the query to resolve the service FQDN. In an implementation, the controller stores the unicast IP address.

The method 6000 includes configuring 6600 a service server associated with the unicast IP address. The controller connects to the service server of the service integrated domain name server via the unicast interface and sets up the service server for receiving and executing a service request.

The method 6000 includes initiating 6700 a service request by the requesting device to the service server. After configuring the service server, the controller directs or instructs the requesting device to send a service request to the service server using the unicast IP address.

The method 6000 includes sending 6800 a service request on the unicast IP address. The requesting device sends the service request upon initiation of or as directed by the controller.

The method 6000 includes receiving 6900 results from the service request. The requesting device saves the results or content from the service server. In an implementation, the controller requests the results from the requesting device. In an implementation, the requesting device automatically sends the results or content to the controller.

The method 6000 includes obtaining 7000 results or content from the requesting device. In an implementation, the controller requests the results from the requesting device. In an implementation, the requesting device automatically sends the results or content to the controller.

In general, a method for service integrated domain name server processing includes receiving, by a requesting device, a service fully qualified domain name (FQDN) and an anycast Internet Protocol (IP) address for service integrated domain name servers, where each service integrated domain name server includes the anycast IP address and a unicast IP address. The requesting device queries the domain name servers on the service integrated domain name servers with the anycast IP address to resolve the service FQDN. The requesting device receives the unicast IP address from a closest service integrated domain name server, saves the unicast IP address, sends a service request on the unicast IP address to a service server on the closest service integrated domain name server, and receives from the service server, results for the service request. In an implementation, each of the service integrated domain name servers is authoritative with respect to the service FQDN. In an implementation, the anycast IP address and the unicast IP address are different IP addresses. In an implementation, the method further includes sending, by the requesting device to a Dynamic Host Configuration Protocol (DHCP), a request for the service FQDN and the anycast IP address. In an implementation, the service FQDN and the anycast IP address are received from a controller when the requesting device is online and reachable. In an implementation, the service FQDN and the anycast IP address are received from a controller for defined events. In an implementation, the method further includes receiving, by the requesting device from a controller, a request to send a service request to the closest service integrated domain name server after the controller has configured a service server on the closest service integrated domain name server by connecting via the unicast IP address retrieved from the requesting device. In an implementation, the method further includes providing, by the requesting device to a controller, the results. In an implementation, the results are sent upon receiving a request by the requesting device from the controller. In an implementation, the method further includes retrieving, by a controller, a saved unicast IP address, connecting, by the controller, with a service server via the unicast IP address, and configuring, by the controller, the service server to perform a service request. In an implementation, the method further includes configuring an IP stack to save the service FQDN and the anycast Internet Protocol (IP) address. In an implementation, the method further includes a first software stack configured to connect to a communications network, and a second software stack configured to connect to the service server.

In general, a method for service integrated domain name server processing includes providing a service fully qualified domain name (FQDN) and a first Internet Protocol (IP) address for service integrated domain name servers, where each service integrated domain name server includes two different IP addresses, retrieving a second IP address from a closest service integrated domain name server, the second IP address resolved by a domain name system server of the closest service integrated domain name server, configuring a service server to process a service request, the service server associated with the second IP address and the closest service integrated domain name server, initiating the service request with the service server via the second IP address, and obtaining results from the service request. In an implementation, each of the service integrated domain name servers is authoritative with respect to the service FQDN. In an implementation, the first IP address and the second IP address are different IP addresses. In an implementation, the first IP address is for a domain name server interface and the second IP address is for a service server interface. In an implementation, the method further includes the first IP address is an anycast IP address and the second IP address is a unicast IP address.

In general, a service integrated domain name server includes a unicast interface, an anycast interface, a service server connected to the unicast interface, a domain name system (DNS) server connected to the anycast interface, where the DNS server is configured to receive, using an anycast Internet Protocol (IP) address over the anycast interface, a request to a resolve a fully qualified domain name (FQDN) associated with the service server and the unicast interface, and send a unicast IP address associated with the unicast interface, and the service server is configured to receive, using the unicast IP address over the unicast interface, a service request, and send results in response to the service request. In an implementation, the service integrated domain name server is authoritative with respect to the FQDN. In an implementation, the anycast IP address and the unicast IP address are different IP addresses.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for service integrated domain name server processing, the method comprising:
   receiving, by a requesting device, a service fully qualified domain name (FQDN) and an anycast Internet Protocol (IP) address for service integrated domain name servers, wherein each of the service integrated domain name servers includes the anycast IP address and a unicast IP address;
   querying, by the requesting device, domain name servers on the service integrated domain name servers with the anycast IP address to resolve the service FQDN;
   receiving, by the requesting device, the unicast IP address from a closest service integrated domain name server;
   saving, by the requesting device, the unicast IP address;
   sending, by the requesting device to a service server on the closest service integrated domain name server, a service request on the saved unicast IP address; and
   receiving, by the requesting device from the service server, results for the service request.

2. The method of claim 1, wherein each of the service integrated domain name servers is authoritative with respect to the service FQDN.

3. The method of claim 1, wherein the anycast IP address and the unicast IP address are different IP addresses.

4. The method of claim 1, further comprising:
   sending, by the requesting device to a Dynamic Host Configuration Protocol (DHCP), a request for the service FQDN and the anycast IP address.

5. The method of claim 1, wherein the service FQDN and the anycast IP address are received from a controller when the requesting device is online and reachable.

6. The method of claim 1, wherein the service FQDN and the anycast IP address are received from a controller for defined events.

7. The method of claim 1, further comprising:
   receiving, by the requesting device from a controller, a request to send the service request to the closest service integrated domain name server after the controller has configured the service server on the closest service integrated domain name server by connecting via the saved unicast IP address retrieved from the requesting device.

8. The method of claim 1, further comprising:
   providing, by the requesting device to a controller, the results.

9. The method of claim 8, wherein the results are sent upon receiving a request by the requesting device from the controller.

10. The method of claim 1, further comprising:
    retrieving, by a controller, the saved unicast IP address;
    connecting, by the controller, with the service server via the unicast IP address; and
    configuring, by the controller, the service server to perform the service request.

11. The method of claim 1, further comprising:
    configuring an IP stack to save the service FQDN and the anycast Internet Protocol (IP) address.

12. The method of claim 1, further comprising:
    a first software stack configured to connect to a communications network; and
    a second software stack configured to connect to the service server.

13. A method for service integrated domain name server processing, the method comprising:
    providing a service fully qualified domain name (FQDN) and a first Internet Protocol (IP) address for service integrated domain name servers, where each of the service integrated domain name servers includes two different IP addresses;
    retrieving a second IP address from a closest service integrated domain name server, the second IP address resolved by a domain name system server of the closest service integrated domain name server;
    configuring a service server to process a service request, the service server associated with the second IP address and the closest service integrated domain name server;
    initiating the service request with the service server via the second IP address; and
    obtaining results from the service request.

14. The method of claim 13, wherein each of the service integrated domain name servers is authoritative with respect to the service FQDN.

15. The method of claim 13, wherein the first IP address and the second IP address are different IP addresses.

16. The method of claim 13, wherein the first IP address is for a domain name server interface and the second IP address is for a service server interface.

17. The method of claim 13, wherein the first IP address is an anycast IP address and the second IP address is a unicast IP address.

18. A service integrated domain name server, comprising:
    a unicast interface;
    an anycast interface;
    a service server connected to the unicast interface;
    a domain name system (DNS) server connected to the anycast interface;
    wherein:
      the DNS server is configured to:
        receive, using an anycast Internet Protocol (IP) address over the anycast interface, a request to a resolve a fully qualified domain name (FQDN) associated with the service server and the unicast interface; and
        send a unicast IP address associated with the unicast interface; and the service server is configured to:
- receive, using the unicast IP address over the unicast interface, a service request; and
- send results in response to the service request.

19. The service integrated domain name server of claim 18, wherein the service integrated domain name server is authoritative with respect to the FQDN.

20. The service integrated domain name server of claim 18, wherein the anycast IP address and the unicast IP address are different IP addresses.

* * * * *